US008415601B2

(12) United States Patent
Bates

(10) Patent No.: US 8,415,601 B2
(45) Date of Patent: Apr. 9, 2013

(54) CIRCULARLY SYMMETRIC ASPHERIC OPTICS PROVIDING NON-MONOTONIC WAVEFRONT PHASE PROFILE AND EXTENDED DEPTH OF FIELD

(75) Inventor: Rob Bates, Erie, CO (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 12/867,828

(22) PCT Filed: Feb. 17, 2009

(86) PCT No.: PCT/US2009/034299
§ 371 (c)(1),
(2), (4) Date: Aug. 16, 2010

(87) PCT Pub. No.: WO2009/103066
PCT Pub. Date: Aug. 20, 2009

(65) Prior Publication Data
US 2010/0328483 A1 Dec. 30, 2010

Related U.S. Application Data

(60) Provisional application No. 61/029,263, filed on Feb. 15, 2008.

(51) Int. Cl.
*G01J 1/20* (2006.01)
*G02B 3/00* (2006.01)
(52) U.S. Cl.
USPC ........................................ 250/201.9; 359/648
(58) Field of Classification Search .............. 250/201.9, 250/216; 359/708, 721, 648
See application file for complete search history.

(56) References Cited

U.S. PATENT DOCUMENTS

| 6,923,539 B2* | 8/2005 | Simpson et al. ........... 351/159.2 |
| 2005/0197809 A1* | 9/2005 | Dowski et al. .................... 703/6 |
| 2006/0176572 A1 | 8/2006 | Fiala |

FOREIGN PATENT DOCUMENTS

JP 05080275 A1 4/1993

OTHER PUBLICATIONS

Optical Research Associates "Prompting Guide," pp. 50-57, 1999.
International Search Report and Written Opinion dated Jun. 2, 2009, issued in related PCT Application Serial No. PCT/US2009/034299, 14 pages.
International Preliminary Report on Patentability dated Aug. 17, 2010, issued in related PCT Application Serial No. PCT/US2009/034299, 6 pages.

* cited by examiner

*Primary Examiner* — Thanh Luu
(74) *Attorney, Agent, or Firm* — Lathrop & Gage LLP

(57) ABSTRACT

Systems and methods include imaging optics having one or more optical elements for modifying a wavefront of electromagnetic energy incident thereon. The wavefront, modified by the optical elements, exhibits a non-monotonic wavefront phase profile. The imaging optics are characterized by a modulation transfer function that is substantially invariant over a range of misfocus. The system optionally includes a detector for receiving the electromagnetic energy from the imaging optics. A method of maintaining modulation transfer invariance over a range of misfocus in an optical imaging system includes modifying a wavefront of electromagnetic energy incident to the optical imaging system such that the wavefront exhibits a non-monotonic wavefront phase profile and a substantially invariant modulation transfer function over the range of misfocus.

10 Claims, 10 Drawing Sheets

FIG. 4
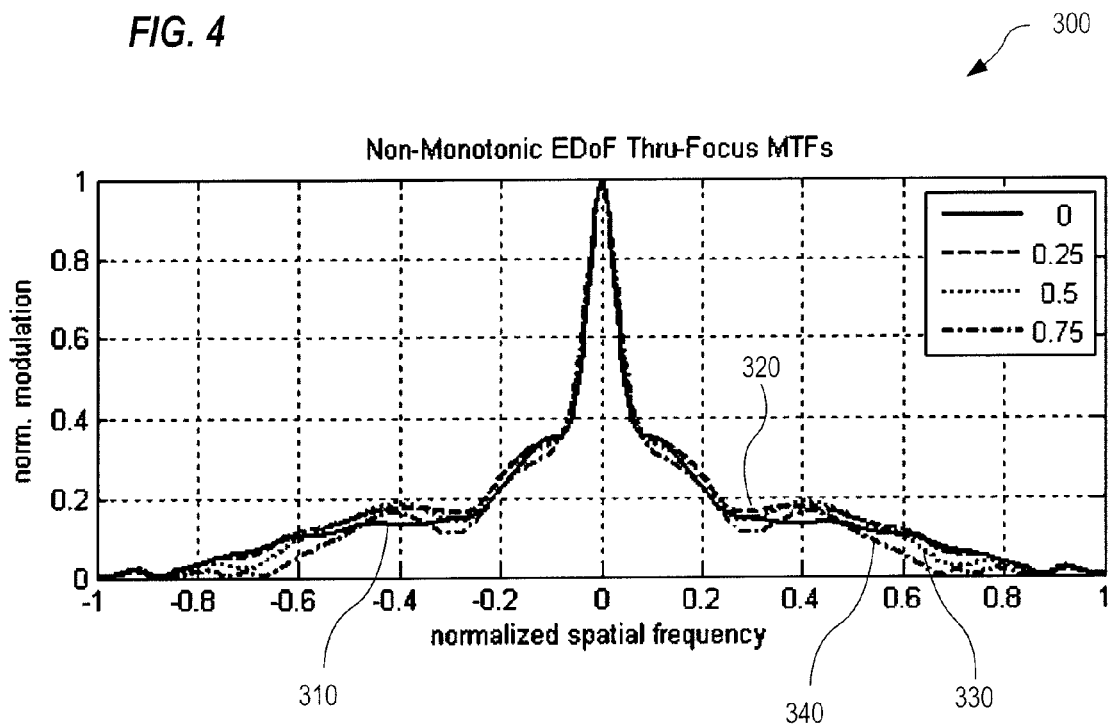
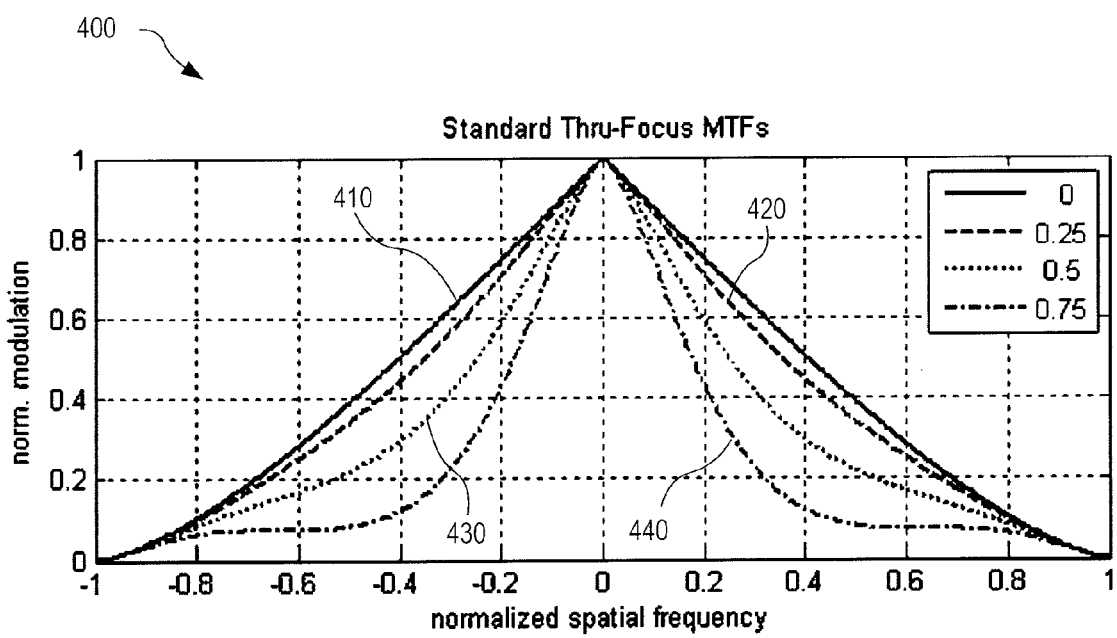
FIG. 5

CIRCULARLY SYMMETRIC ASPHERIC OPTICS PROVIDING NON-MONOTONIC WAVEFRONT PHASE PROFILE AND EXTENDED DEPTH OF FIELD

CROSS-REFERENCE TO RELATED APPLICATIONS

This application claims priority to U.S. Provisional Patent application No. 61/029,263, filed on 15 Feb. 2008 and entitled CIRCULARLY SYMMETRIC ASPHERIC LENS HAVING NON-MONOTONIC PHASE DEVIATION AND EXTENDED DEPTH OF FIELD, which application is incorporated herein by reference in its entirety. U.S. Pat. Nos. 5,748,371, 6,940,649, 7,115,849, 7,218,448 and 7,649,302 are also incorporated herein by reference in their entireties.

BACKGROUND

Limited depth of field is a common issue in imaging. It is well known to photographers that stopping down an aperture of an imaging device (e.g., a camera) can increase depth of field, but this technique reduces light available to the imaging device. Certain imaging devices increase depth of field by modifying phase with circularly asymmetric optics, but such devices may be difficult or costly to manufacture due to a need to align the asymmetrical optics within the device.

SUMMARY

The following embodiments and aspects thereof are described and illustrated in conjunction with systems, tools and methods which are meant to be exemplary and illustrative, not limiting in scope. In various embodiments, one or more limitations associated with the above-described systems and methods have been addressed, while other embodiments are directed to other improvements.

In an embodiment, imaging optics include one or more optical elements for modifying a wavefront of electromagnetic energy incident thereon. The wavefront, modified by transmission through the optical elements, exhibits a non-monotonic wavefront phase profile. The imaging optics are characterized by a modulation transfer function that is substantially invariant over a range of misfocus.

In an embodiment, an optical imaging system includes imaging optics for modifying a wavefront of electromagnetic energy such that the wavefront, modified by transmission through the imaging optics, forms a non-monotonic wavefront phase profile. The imaging optics are characterized by a modulation transfer function ("MTF") that is substantially invariant over a range of misfocus. The system also includes a detector for receiving the electromagnetic energy from the imaging optics.

In an embodiment, a computer-based method of optimizing an optical imaging system to extend depth of field of the system includes providing an initial model of the optical imaging system in a computer-based simulation tool, and evaluating depth of field of the initial model. The method also includes generating a revised model of the optical imaging system by adding an initial estimate of design parameters for an aspheric optical element to the initial model, and establishing a depth of field goal within the simulation tool that exceeds the depth of field of the initial model. The method operates an optimizer of the simulation tool to vary the design parameters until the optimizer converges on final design parameters for the aspheric optical element such that the system forms a non-monotonic wavefront phase profile. A final model of the optical imaging system, including the final design parameters, meets or exceeds the depth of field goal.

In an embodiment, a computer-based method of optimizing an optical surface to extend depth of field of an optical imaging system includes providing an initial model of optics of the optical imaging system without the optical surface, in a computer-based simulation tool, and evaluating depth of field of the initial model. The method also includes generating a revised model of the optics by adding an initial estimate of design parameters for the optical surface, including a monotonic phase deviation from a spherical surface, to the initial model, and establishing a depth of field goal within the simulation tool that exceeds a depth of field of the optical imaging system without the optical surface. An optimizer of the simulation tool varies the design parameters until the optimizer converges on final design parameters for the optical surface that include a non-monotonic phase deviation, with a final model of the optics including the optical surface that meets or exceeds the depth of field goal.

In an embodiment, a method of maintaining modulation transfer invariance over a range of misfocus in an optical imaging system includes modifying a wavefront of electromagnetic energy incident to the optical imaging system such that the wavefront exhibits a non-monotonic wavefront phase profile and a substantially invariant modulation transfer function over the range of misfocus.

BRIEF DESCRIPTION OF THE DRAWINGS

Exemplary embodiments are illustrated in referenced figures of the drawings. It is intended that the embodiments and figures disclosed herein are to be illustrative rather than limiting.

FIG. 4 shows a plot of modulation transfer functions ("MTFs") produced by an imaging system that includes the aspheric surface shown in FIG. 2.

FIG. 5 shows a plot of MTFs produced by an imaging system that does not include the aspheric surface shown in FIG. 2.

DETAILED DESCRIPTION OF THE DRAWINGS

Figure 1:
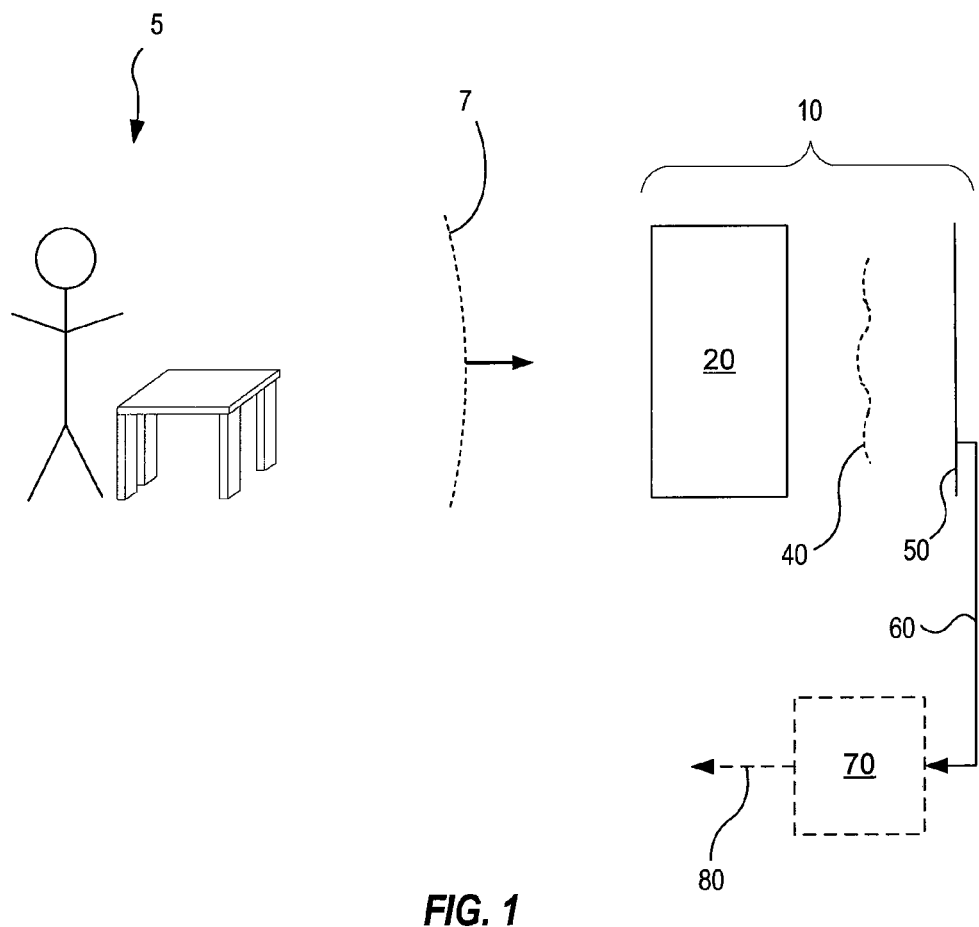
FIG. 1 shows an imaging system that provides a non-monotonic wavefront phase profile and has extended depth of field, according to an embodiment.

The following description is presented to enable one of ordinary skill in the art to make and use the embodiments herein, and is provided in the context of a patent application and its requirements. Various modifications to the described embodiments will be readily apparent to those skilled in the art and the principles herein may be applied to other embodiments. Thus, the present disclosure is not intended to be limited to the embodiments shown but is to be accorded the widest scope consistent with the principles and features described herein. In the drawings, like reference numbers are used to refer to like components whenever possible. It is noted that, for purposes of illustrative clarity, certain elements in the drawings may not be drawn to scale.

FIG. 1 shows an imaging system 10 that provides a non-monotonic wavefront phase profile and has extended depth of field. A wavefront 7 of electromagnetic energy emanates from a scene 5 towards imaging system 10 (e.g., in the direction of an arrow pointing from wavefront 7). The electromagnetic energy that forms wavefront 7 may be, for example, any of visible, ultraviolet, infrared, microwave or radio frequency radiation. Imaging system 10 utilizes optics 20 to modify the wavefront to form a non-monotonic wavefront phase profile 40. The electromagnetic energy forms an image at a detector 50 that generates image data 60 according to the image. Imaging system 10 optionally includes an image processor 70 that produces processed image data 80, for example by filtering image data 60. Filtering may be performed by convoluting image data 80 with a filter kernel that at least approximately reverses a point spread function of optics 20.

Eq. 1 represents one example of an equation describing a surface sag sag(r) for a circularly symmetric aspheric lens that provides a non-monotonic wavefront phase profile and extended depth of field ("EDoF"), where 'r' is in units of mm:

$$sag(r) = \sum_{i=1}^{6} a_i r^{2i} + \gamma \sum_{j=1}^{10} b_j d^{p_j} \quad (1)$$

where $$d = \begin{bmatrix} r : 0 < r < 0.70418 \\ 0.70418 : \text{otherwise,} \end{bmatrix}$$

$a_{i=1:6} = [-4.65e^{-3} \quad -2.90e^{-2} \quad -4.16e^{-1} \quad -1.47 \quad 2.02 \quad -9.62]$, $b_{j=1:10} =$
   $[-2.18 \quad 2.55 \quad 2.59 \quad 3.98 \quad -6.84 \quad 4.07 \quad 7.33 \quad -4.25 \quad 7.68 \quad -36.54]$, $p_{j=1:10} = [1 \quad 2 \quad 3 \quad 4 \quad 5 \quad 6 \quad 7 \quad 8 \quad 9 \quad 20.08546]$, and $\gamma = 5.401e^{-5}$.

Figure 2:
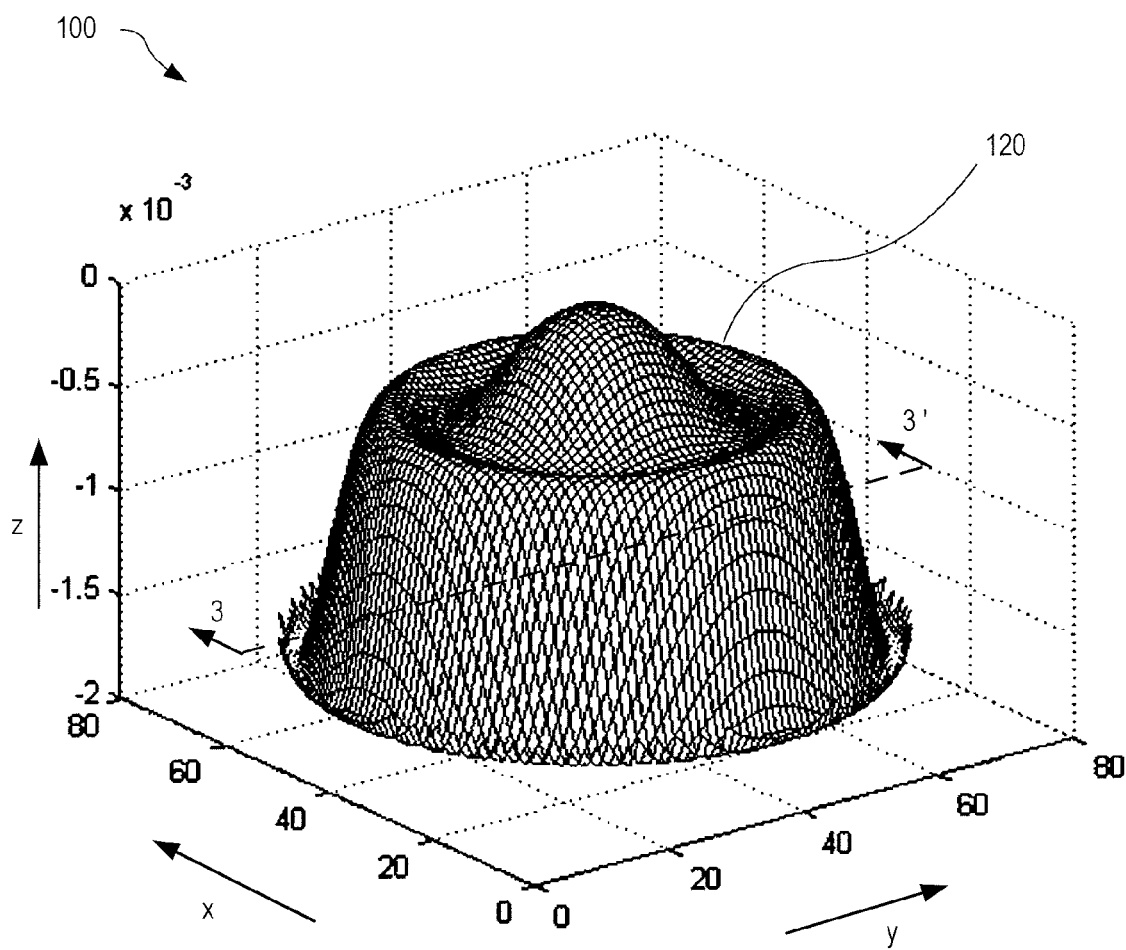
FIG. 2 shows a plot that represents the circularly symmetric aspheric lens surface described by Eq. 1, according to an embodiment.

FIG. 2 shows a three-dimensional "3-D" mesh plot 100 that represents the circularly symmetric aspheric lens surface described by Eq. 1, referred to as aspheric surface 120 herein. Aspheric surface 120 may be, for example, one surface of an aspheric optical element that may be included in optics 20 (FIG. 1). Aspheric surface 120 may be superimposed, or integrated onto a surface of an existing optical element in optics 20, or it may be a separate optical element. Each of the horizontal (x and y) axes is in millimeters; the vertical (z) axis is scaled by a factor of 1000 compared to the x and y axes, as indicated by "x $10^{-3}$" on the z-axis.

Figure 3:
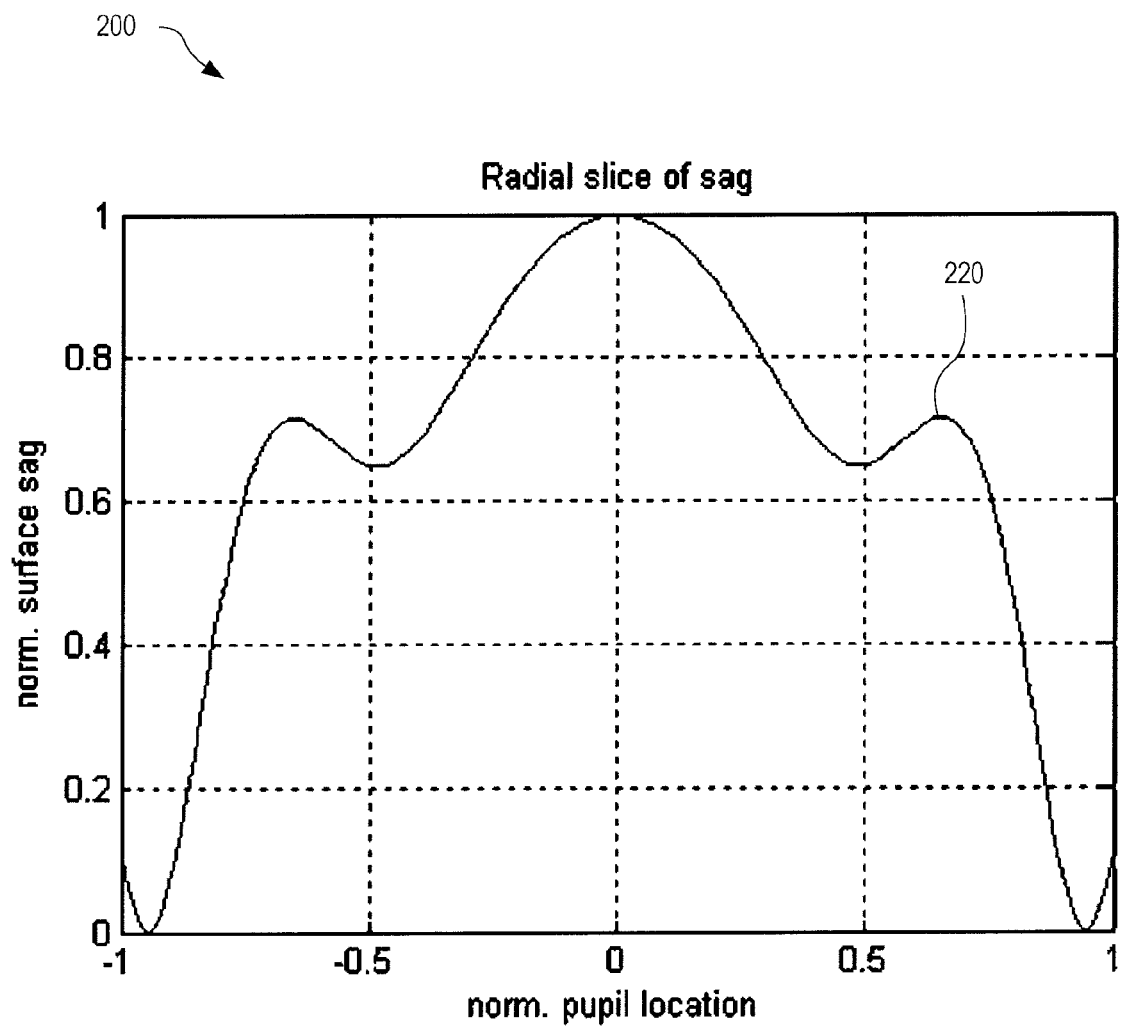
FIG. 3 shows a plot that represents a cross section of the aspheric surface shown in FIG. 2.

FIG. 3 shows a plot 200 that represents a cross section 220 of aspheric surface 120 shown in FIG. 2. A cross-sectional plane from which the plot shown in FIG. 3 is taken, is shown by dashed line 3-3'. Plot 200 utilizes normalized coordinates on the horizontal axis (the label "norm. pupil location" denotes location across the lens) and the vertical axis (showing "norm. surface sag" as the term would be known to one skilled in optics).

FIG. 4 shows a plot 300 of modulation transfer functions ("MTFs") 310, 320, 330, 340 produced by an imaging system that includes the aspheric surface 120, for 0, 0.25, 0.5, and 0.75 waves of defocus, respectively. In plot 300, the horizontal axis represents normalized spatial frequency from zero to a maximum spatial frequency imaged by the imaging system. The similarity of MTFs 310, 320, 330, 340 in FIG. 4 illustrates to one skilled in imaging that aspheric surface 120 is substantially invariant to misfocus over at least this range. Similarity of MTFs is but one way to discern that an imaging system is substantially invariant to misfocus. U.S. Pat. Nos. 5,748,371, 6,940,649, 7,115,849, 7,218,448 and 7,469,202 may be reviewed for other ways of judging whether an imaging system is substantially invariant to misfocus.

Figure 6:
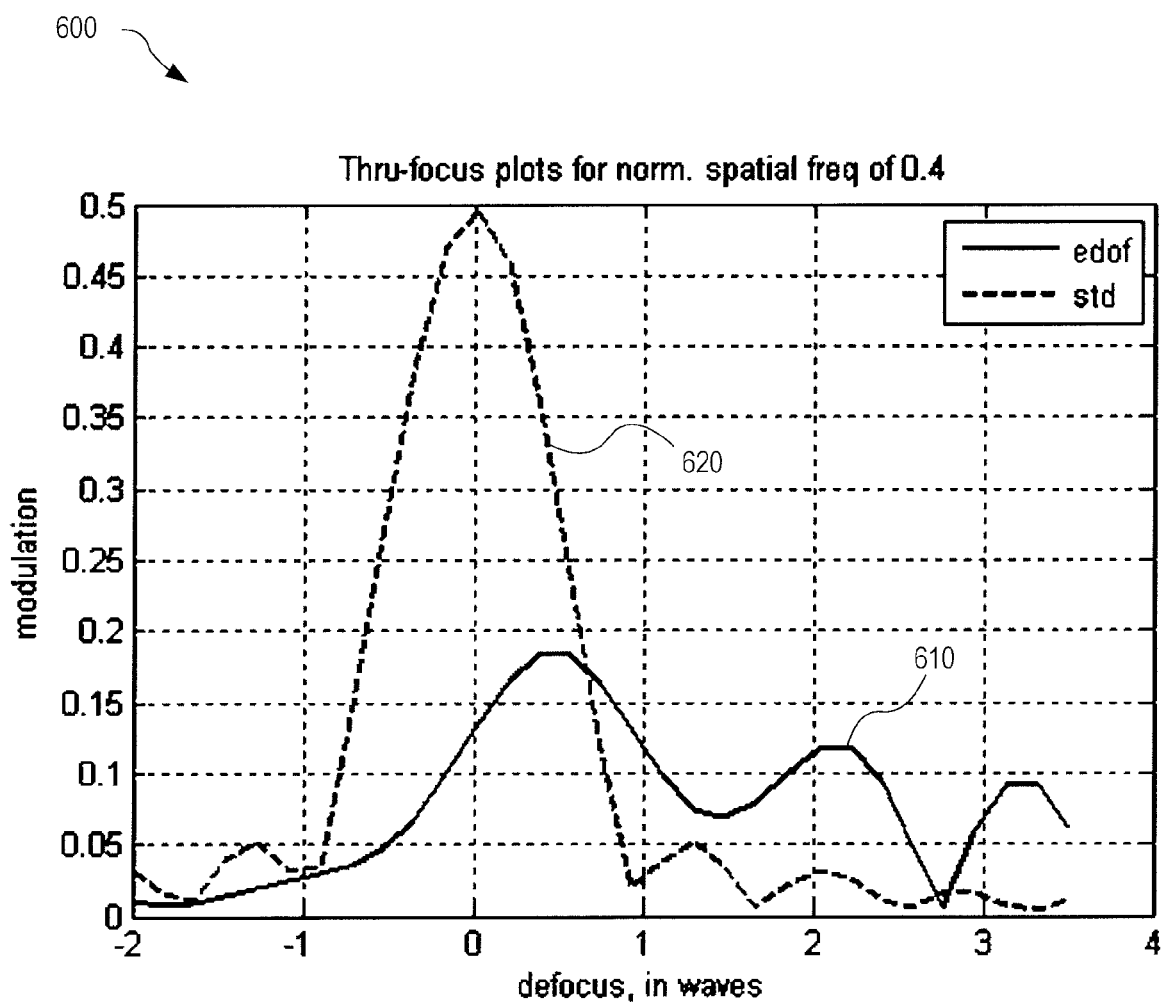
FIG. 6 shows a thru-focus plot of modulation vs defocus for a single normalized spatial frequency of 0.4, for the imaging systems that do and do not include the aspheric surface shown in FIG. 2.

In contrast to FIG. 4, FIG. 5 shows a plot 400 of MTFs produced by a "standard" imaging system, that is, a system corresponding to the system that generated plot 300, but without aspheric surface 120 (FIG. 2). Plot 400 includes curves 410, 420, 430 and 440 showing MTF for 0, 0.25, 0.5, and 0.75 waves of defocus, respectively, at 580 nm. FIG. 6 illustrates a sensitivity to misfocus in the standard imaging system without aspheric surface 120, to one skilled in imaging.

FIG. 6 shows a thru-focus plot 600 of modulation vs defocus for a single normalized spatial frequency of 0.4 for the same imaging systems whose performance is shown in FIGS. 4-7. Plot 600 includes a curve 610 (also labeled "edof") for the imaging system with aspheric surface 120 and a curve 620 (also labeled "std") for the standard imaging system without aspheric surface 120. This plot shows that the addition of aspheric surface 120 in the imaging system yields a greater misfocus region of modulation above zero than the "standard" imaging system.

A non-monotonic wavefront (e.g., wavefront 40, FIG. 1) that provides extended depth of field may be produced by addition of certain monotonic phase surfaces to otherwise monotonic, spherical optics. For example, Eq. 2 represents a surface sag of a monotonic aspheric optical element that, when utilized within an imaging system, produces a non-monotonic wavefront phase profile.

$$sag(r) = \frac{Cr^2}{1 + \sqrt{1 - (1+K)C^2 r^2}} + \sum_{i=1}^{14} a_i r^i \quad \text{Eq. 2}$$

where

Figure 7:
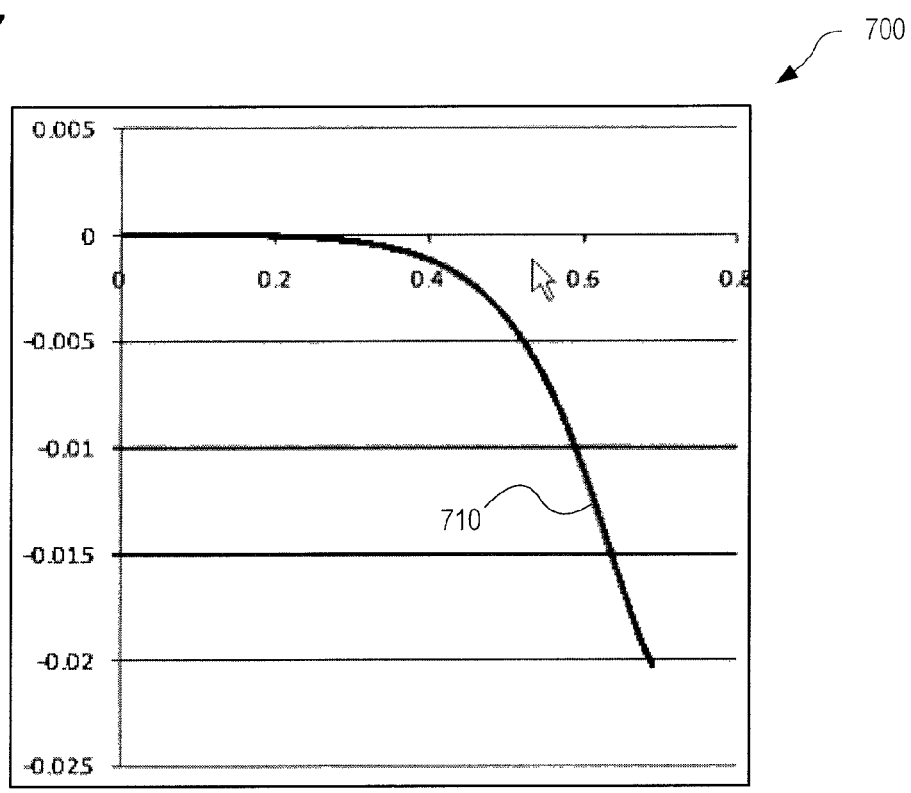
FIG. 7 shows a plot that represents an aspheric component of the optical surface sag defined by Eq. 2, according to an embodiment.

-continued $K$ = conic = 0.800058, $C$ = radius of curvature = 1.19134, and $A_{i=1:14} = [0 \ \ 0 \ \ 0 \ \ -2.83e^{-2} \ \ 0 \ \ -7.36e^{-2}$ $\qquad 0 \ \ -1.41e^{-1} \ \ 0 \ \ -6.33e^{-1} \ \ 0 \ \ -3.05e^{-1} \ \ 0 \ \ 3.67]$ The second term (summation term) in Eq. 2 represents an aspheric component of the overall surface sag defined by Eq. 2. FIG. 7 shows a plot 700 that represents this aspheric component as curve 710, with the vertical axis of plot 700 corresponding to the surface sag component in millimeters and the horizontal axis corresponding to radius in millimeters. It can be seen that within the range of radius plotted in plot 700, curve 710 is monotonic.

Figure 8:
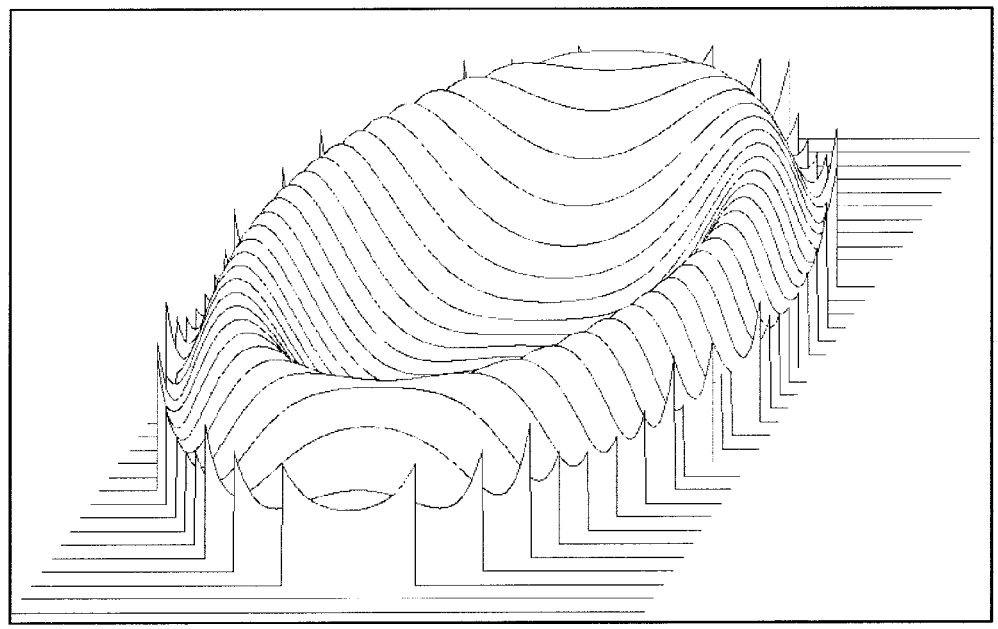
FIG. 8 shows a plot of a non-monotonic wavefront produced by an imaging system that includes an aspheric optical element having the surface sag defined by Eq. 2.

FIG. 8 shows a plot 800 of a non-monotonic wavefront produced by an imaging system that includes an aspheric optical element having the surface sag defined by Eq. 2.

Figure 9:
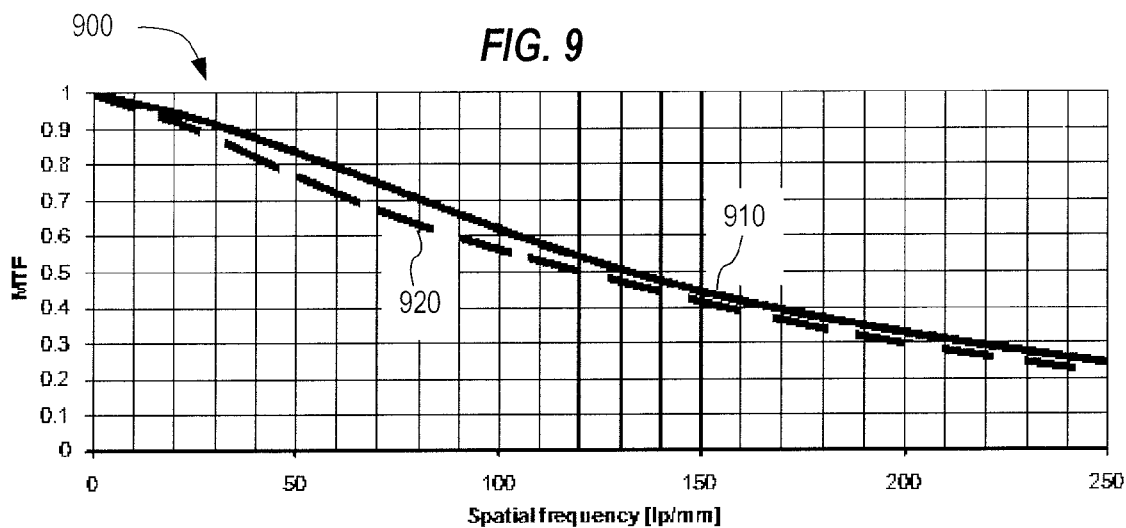
FIG. 9 shows a plot that contrasts performance of an optical system that includes an aspheric element having the surface sag defined by Eq. 2, and is focused at infinity, with performance of an equivalent system that does not utilize the aspheric element.
Figure 10:
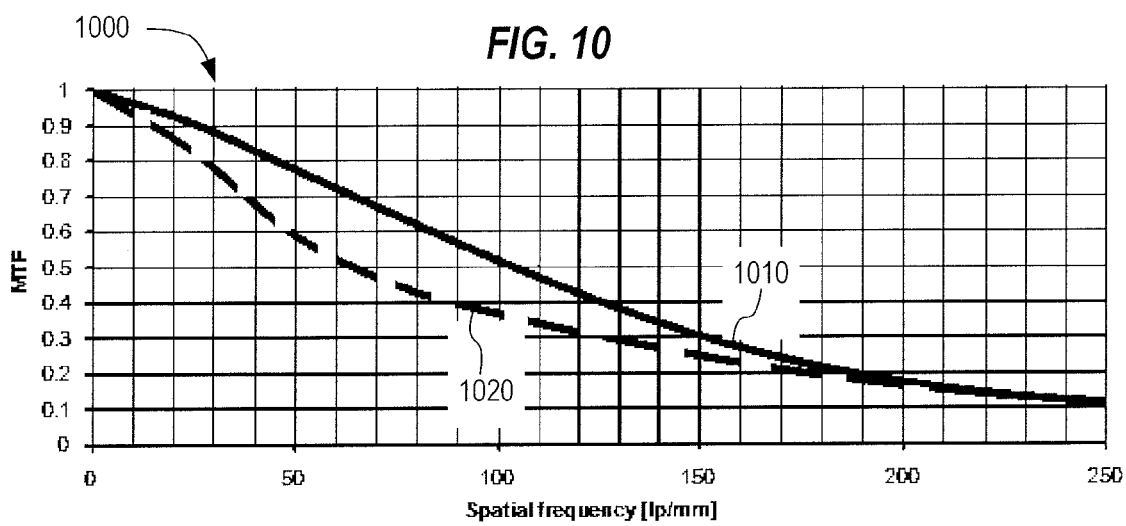
FIG. 10 shows a plot that contrasts performance of an optical system that includes an aspheric element having the surface sag defined by Eq. 2, and is focused at 35 cm, with performance of an equivalent system that does not utilize the aspheric element.
Figure 11:
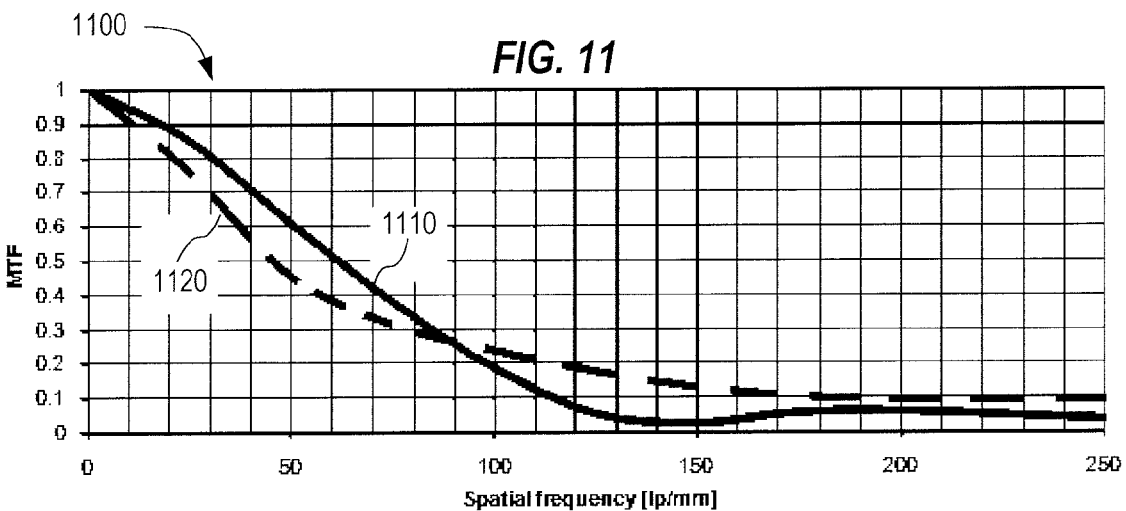
FIG. 11 shows a plot that contrasts performance of an optical system that includes an aspheric element having the surface sag defined by Eq. 2, and is focused at 25 cm, with performance of an equivalent system that does not utilize the aspheric element.

FIG. 9, FIG. 10 and FIG. 11 show plots 900, 1000 and 1100 respectively, that contrast performance of an optical system that includes an aspheric element with the surface sag defined by Eq. 2 with performance of an equivalent system that does not utilize the aspheric element. FIG. 9 illustrates performance of the two systems focused at infinity, with curve 910 showing system MTF for the system without the aspheric element, and curve 920 showing system MTF for the system with the aspheric element. FIG. 10 illustrates performance of the two systems focused at 35 cm, with curve 1010 showing system MTF for the system without the aspheric element, and curve 1020 showing system MTF for the system with the aspheric element. FIG. 11 illustrates performance of the two systems focused at 25 cm, with curve 1110 showing system MTF for the system without the aspheric element, and curve 1120 showing system MTF for the system with the aspheric element. Attention is drawn to the similarities of curves 920, 1020 and 1120, indicating that the system that utilizes phase function 710 performs consistently across changes of focus. The dissimilarities of curves 910, 1010 and 1110 indicate that the system that does not utilize the aspheric element varies in performance with changes of focus.

Figure 12:
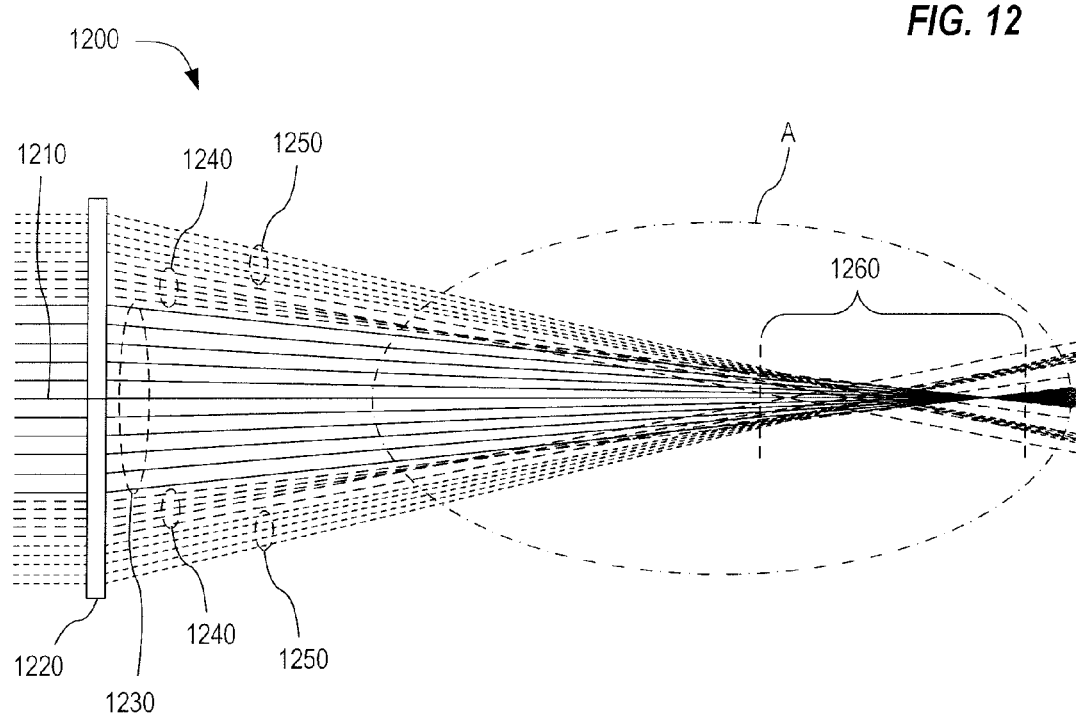
FIG. 12 shows a ray plot of electromagnetic energy passing through an imaging system, according to an embodiment.

FIG. 12 shows a ray plot 1200 of electromagnetic energy passing through an imaging system, according to an embodiment. FIG. 12 illustrates that optics that produce non-monotonic wavefront phase profiles provide an ability to direct electromagnetic energy rays based in part on spatial frequencies present in a scene being imaged. For example, rays representing bands of higher spatial frequencies (e.g., those rays captured by the periphery of an aperture of the optics) can be made to intersect an optical axis at different points, or along a different distribution of points, than rays representing bands of lower spatial frequencies (e.g., rays near a center of an aperture of the optics). The ability to distribute intersection of electromagnetic energy with the optical axis based on bands of spatial frequency generates additional degrees of freedom in optical design as compared to standard design methods, as will now be explained. In ray plot 1200, rays 1230 correspond to features of low spatial frequency and pass through optics 1220 near its center. Rays 1240 correspond to features of higher spatial frequency and pass through optics 1220 partway between its center and its edges. Rays 1250 correspond to features of highest spatial frequency and pass through optics 1220 near its edges. Optics 1220 are configured to direct rays 1230, 1240 and 1250 at various depths within an image capture volume 1260. Rays 1230 intersect an optical axis 1210 furthest within image capture volume 1260, rays 1250 intersect optical axis 1210 near the front (e.g., nearest optics 1220) within image capture volume 1260, and rays 1240 intersect optical axis 1210 at a variety of depths within image capture volume 1260. These depths are seen more clearly in FIG. 13, which shows a detailed view of the region shown as A in FIG. 12.

Figure 13:
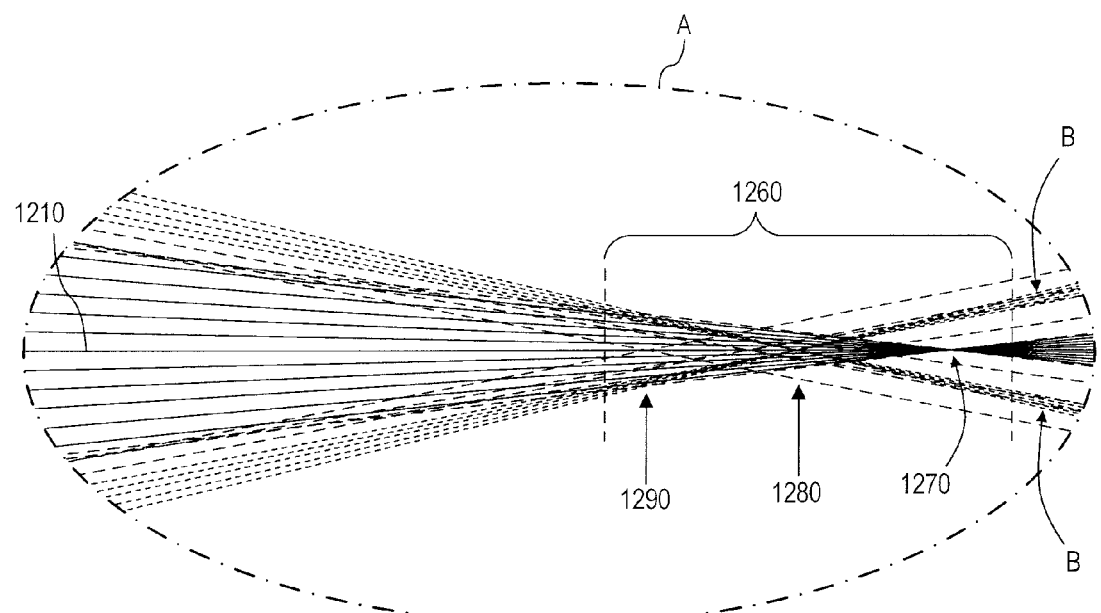
FIG. 13 shows a detailed view of a region shown in FIG. 12.

In FIG. 13, point 1270 denotes where rays 1230 intersect. Point 1280 denotes where rays 1250 intersect (point 1280 may be appreciated most clearly by following the packets of rays marked B back to where they cross optical axis 1210, above the straight arrow). Rays 1240, however, intersect at a variety of locations depending on exactly where they are captured by optics 1220. For example, certain of rays 1240 intersect at a shallow depth (e.g., closer to optics 1220) within image capture volume 1260, at point 1290. Other of rays 1240 intersect further back (e.g., further from optics 1220) within image capture volume 1260, at point 1270.

Upon reviewing FIGS. 12 and 13 while reading and understanding the descriptions thereof, one skilled in the art appreciates that optics that produce the various focal distances for differing spatial frequencies in the manner shown, with a circularly symmetric optical element, may generate a non-monotonic wavefront phase profile. That is, considering the points shown in FIG. 13, a non-monotonic wavefront phase profile can cause rays 1230 and 1250 to intersect optical axis 1210 at points 1270 and 1280 while rays 1240 intersect optical axis 1210 at a variety of depths between and outside the depths corresponding to points 1270 and 1280. Furthermore, it will be appreciated that although intersection of rays 1230, 1240 and 1250 with the optical axis is shown for clarity of illustration in FIGS. 12 and 13, an optical designer may optimize for other field angles than the "on axis" ray. Therefore what is illustrated is a method of optimizing distribution of electromagnetic energy representing differing frequency bands at different depths throughout an image capture volume, both on and off the optical axis.

Figure 14:
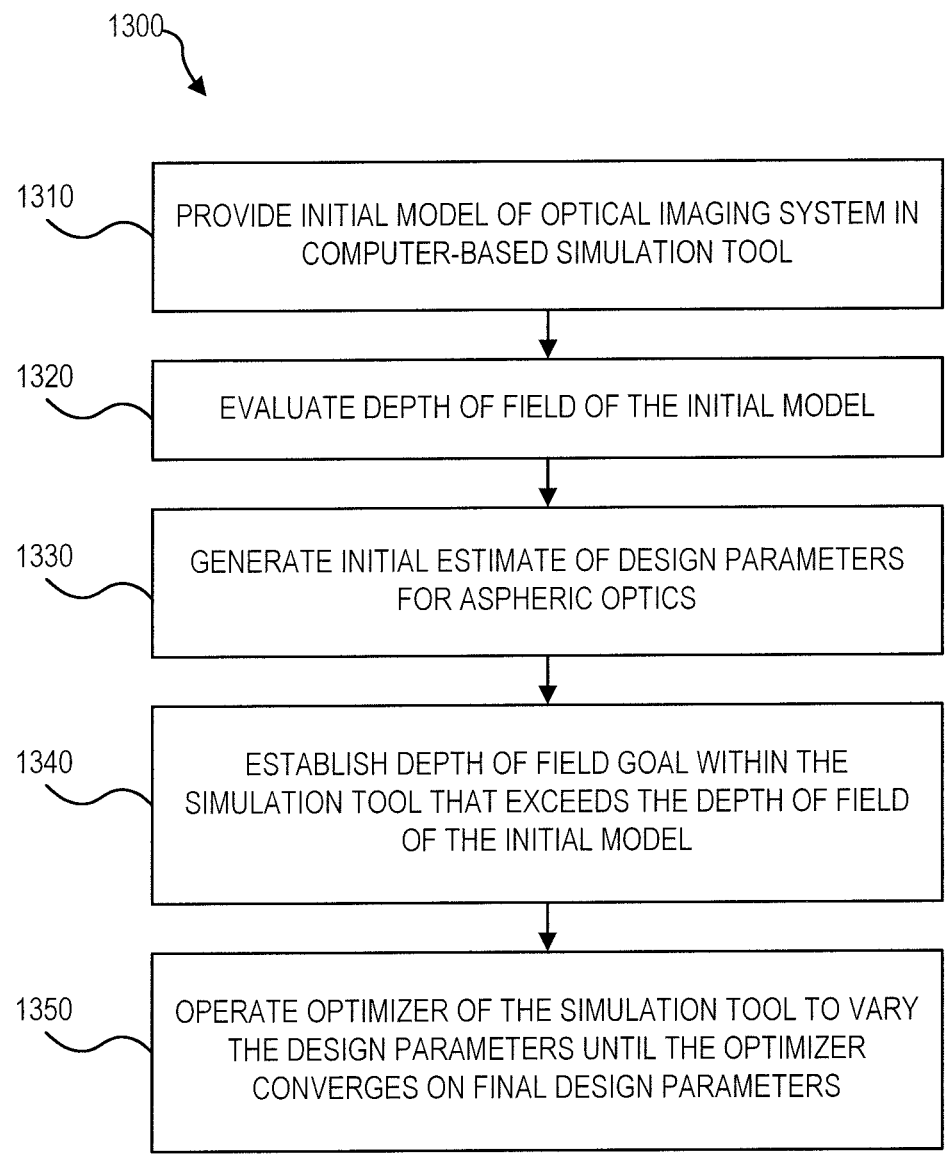
FIG. 14 is a flowchart illustrating a method of optimizing an optical imaging system to extend depth of field of the system, according to an embodiment.

FIG. 14 is a flowchart illustrating a method 1300 of optimizing an optical imaging system to extend depth of field of the system, according to an embodiment. Step 1310 of method 1300 provides an initial model of an optical imaging system in a computer-based simulation tool. The initial model is, for example, based on standard optics (e.g., optics that produce a spherical, converging wavefront). Step 1320 evaluates a depth of field of the initial model. Step 1330 generates an initial estimate of design parameters for aspheric optics, either by adding such parameters to the initial model or modifying parameters already present in the initial model. The design parameters generated in step 1330 may be parameters that will cause the aspheric optics (in concert with other elements of the system) to produce a non-monotonic wavefront phase profile, or may be parameters that will cause the aspheric optics to produce a standard (e.g., monotonic) wavefront phase profile that can be modified in optimization. Step 1340 establishes a depth of field goal within the simulation tool, that exceeds the depth of field of the initial model (e.g., as evaluated in step 1320).

Step 1350 operates an optimizer that varies design parameters of the optical imaging system, including the aspheric optics, until it converges on final design parameters. The final design of the aspheric optics causes the imaging system to produce a non-monotonic wavefront phase profile while meeting the depth of field goal. In addition to surface sags of the aspheric optics, the optimizer may specify and/or modify assigned values of size, materials, material properties, wavelength, location and/or shape of elements of the system. In this context, a detector (typically located at a back focal plane of a system) is considered one of the elements, and accordingly characteristics and/or location of the detector may be specified and/or modified by the optimizer. Optimizers capable of performing aspects of the optimization discussed herein are described in U.S. Pat. No. 7,469,302.

Figure 15:
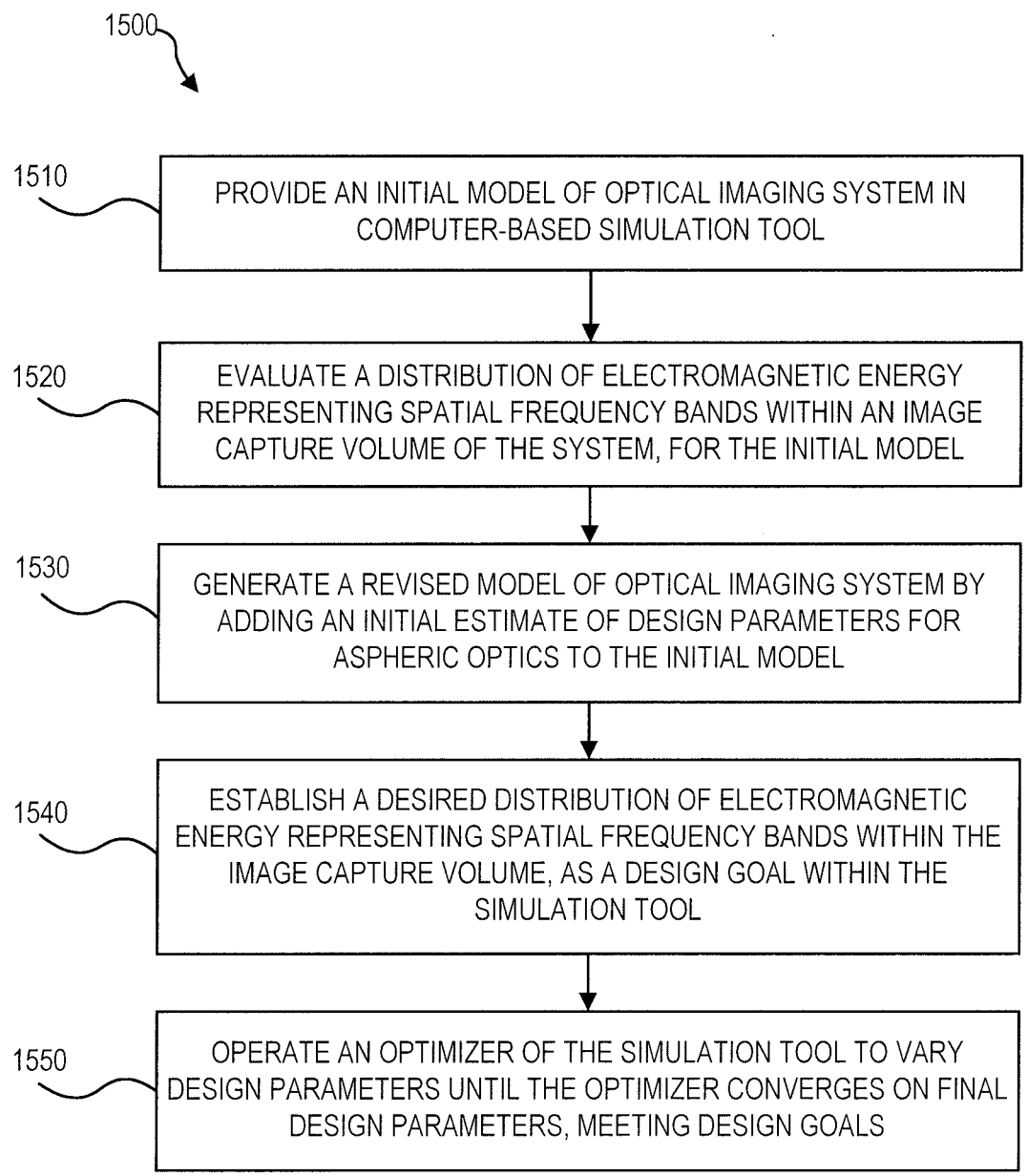
FIG. 15 is a flowchart illustrating a method of optimizing an optical imaging system to include a specified distribution of electromagnetic energy representing certain spatial frequency bands, according to an embodiment.

In addition to or instead of a depth of field goal, design goals that may be specified may include modulation (e.g., an MTF) for certain spatial frequencies, and/or one or more ranges of distribution for electromagnetic energy representing certain bands of available spatial frequencies. For example, FIG. 15 is a flowchart illustrating a method 1500 of optimizing an optical imaging system to include a specified distribution of electromagnetic energy representing certain spatial frequency bands, according to an embodiment. Step 1510 of method 1500 provides an initial model of an optical imaging system in a computer-based simulation tool. The initial model is, for example, based on standard optics (e.g., optics that produce a spherical, converging wavefront). Step 1520 evaluates a distribution of electromagnetic energy representing various spatial frequencies, within an image capture volume of the system, for the initial model. Step 1530 generates a revised model of the optical imaging system, by adding an initial estimate of design parameters for aspheric optics to the initial model. Step 1530 may include, for example, either adding the aspheric optics design parameters to the initial model, or modifying design parameters already present in the initial model. The aspheric optics design parameters generated in step 1530 may be parameters that will cause the aspheric optics (in concert with other elements of the system) to produce a non-monotonic wavefront phase profile, or may be parameters that will cause the aspheric optics to produce a standard (e.g., monotonic) wavefront phase profile that can be modified in optimization.

Step 1540 establishes a particular distribution of electromagnetic energy that represents certain bands of spatial frequencies within the image capture volume, as a design goal within the simulation tool. Such design goal may result in electromagnetic energy representing particular bands of spatial frequencies being spread more throughout the image capture volume (e.g., resulting in a greater depth of field for those bands) as compared with electromagnetic energy representing other bands of spatial frequencies. Step 1550 operates an optimizer that varies design parameters of the optical imaging system, including the aspheric optics, until it converges on final design parameters. The final design of the aspheric optics causes the imaging system to produce a non-monotonic wavefront phase profile while meeting the goal of distribution of electromagnetic energy as defined in step 1540. In addition to surface sags of the aspheric optics, the optimizer may specify and/or modify assigned values of size, materials, material properties, wavelength, location and/or shape of elements of the system. In this context, a detector (typically located at a back focal plane of a system) is considered one of the elements, and accordingly characteristics and/or location of the detector may be specified and/or modified by the optimizer. Optimizers capable of performing aspects of the optimization discussed herein are described in U.S. Pat. No. 7,469,302.

The changes described above, and others, may be made in the circularly symmetric aspheric optical elements providing non-monotonic wavefront phase profile and extended depth of field described herein, without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:
1. Imaging optics comprising:
   at least one circularly symmetric optical element having a surface sag described by:

$$sag(r) = \sum_{i=1}^{6} a_i r^{2i} + \gamma \sum_{j=1}^{10} b_j d^{p_j}$$

where $$d = \begin{bmatrix} r : 0 < r < 0.70418 \\ 0.70418 : \text{otherwise}, \end{bmatrix}$$

$a_{i=1:6} = [\,-4.65e^{-3} \quad -2.90e^{-2} \quad -4.16e^{-1} \quad -1.47 \quad 2.02 \quad -9.62\,]$, $b_{j=1:10} = [-2.18 \quad 2.55 \quad 2.59$
$\qquad\qquad 3.98 \quad -6.84 \quad 4.07 \quad 7.33 \quad -4.25 \quad 7.68 \quad -36.54]$, $p_{j=1:10} = [\,1 \quad 2 \quad 3 \quad 4 \quad 5 \quad 6 \quad 7 \quad 8 \quad 9 \quad 20.08546\,]$, and $\gamma = 5.401e^{-5}$.

2. Imaging optics comprising:
   at least one circularly symmetric optical element having a surface sag described by:

$$sag(r) = \frac{Cr^2}{1 + \sqrt{1 - (1+K)C^2 r^2}} + \sum_{i=1}^{14} a_i r^i$$

where $K = \text{conic} = 0.800058$, $C = \text{radius of curvature} = 1.19134$, and $A_{i=1:14} = [0 \quad 0 \quad 0 \quad -2.83e^{-2} \quad 0 \quad -7.36e^{-2}$
$\qquad\qquad 0 \quad -1.41e^{-1} \quad 0 \quad -6.33e^{-1} \quad -3.05e^{-1} \quad 0 \quad 3.67]$.

3. An optical imaging system, comprising at least one circularly symmetric optical element having a surface sag described by:

$$sag(r) = \sum_{i=1}^{6} a_i r^{2i} + \gamma \sum_{j=1}^{10} b_j d^{p_j}$$

where $$d = \begin{bmatrix} r : 0 < r < 0.70418 \\ 0.70418 : \text{otherwise}, \end{bmatrix}$$

$a_{i=1:6} = [\,-4.65e^{-3} \quad -2.90e^{-2} \quad -4.16e^{-1} \quad -1.47 \quad 2.02 \quad -9.62\,]$, $b_{j=1:10} =$
$\qquad [-2.18 \quad 2.55 \quad 2.59 \quad 3.98 \quad -6.84 \quad 4.07 \quad 7.33 \quad -4.25 \quad 7.68 \quad -36.54]$, $p_{j=1:10} = [\,1 \quad 2 \quad 3 \quad 4 \quad 5 \quad 6 \quad 7 \quad 8 \quad 9 \quad 20.08546\,]$, and $\gamma = 5.401e^{-5}$.

4. The optical imaging system of claim 3, further comprising a detector producing electronic image data in response to electromagnetic energy imaged thereon through the at least one optical element, the system further comprising a post processor for sharpening an image produced by the detector, by convoluting the image data with a filter kernel that at least approximately reverses a point spread function of the optical imaging system.

5. An optical imaging system comprising at least one circularly symmetric optical element having a surface sag described by:

$$sag(r) = \frac{Cr^2}{1+\sqrt{1-(1+K)C^2 r^2}} + \sum_{i=1}^{14} a_i r^i$$

where $K$ = conic = 0.800058, $C$ = radius of curvature = 1.19134, and $A_{i=1:14} = [0\ 0\ 0\ -2.83e^{-2}\ 0\ -7.36e^{-2}$
$\quad 0\ -1.41e^{-1}\ 0\ -6.33e^{-1}\ 0\ -3.05e^{-1}\ 0\ 3.67].$ 6. The optical imaging system of claim 5, further comprising a detector producing electronic image data in response to electromagnetic energy imaged thereon through the at least one optical element, the system further comprising a post processor for sharpening an image produced by the detector, $$sag(r) = \frac{Cr^2}{1+\sqrt{1-(1+K)C^2 r^2}} + \sum_{i=1}^{} a_i r^i$$

where $K$ = conic = 0.800058, $C$ = radius of curvature = 1.19134, and $A_{i=1:14} =$
$[0\ 0\ 0\ -2.83e^{-2}\ 0\ -7.36e^2\ 0\ -1.41e^{-1}\ 0\ -6.33e^{-1}\ 0\ -3.05e^{-1}\ 0\ 3.67],$ by convoluting the image data with a filter kernel that at least approximately reverses a point spread function of the optical imaging system.

7. A computer-based method of optimizing an optical imaging system to extend depth of field of the system, comprising providing an initial model of the optical imaging system in a computer-based simulation tool;

evaluating depth of field of the initial model;

generating a revised model of the optical imaging system by adding an initial estimate of design parameters for aspheric optics to the initial model, wherein at least one optical element of said aspheric optics has a surface sag described by:

$$sag(r) = \sum_{i=1}^{6} a_i r^{2i} + \gamma \sum_{j=1}^{10} b_j d^{p_j}$$

where $d = \begin{bmatrix} r: 0 < r < 0.70418 \\ 0.70418: \text{otherwise,} \end{bmatrix}$ $a_{i=1:6} = [-4.65e^{-3}\ -2.90e^{-2}\ -4.16e^{-1}\ -1.47\ 2.02\ -9.62],$ $a_{j=1:10} = [-2.18\ 2.55$ -continued
$\quad 2.59\ 3.98\ -6.84\ 4.07\ 7.33\ -4.25\ 7.68\ -36.54\ ],$ $p_{j=1:10} = [1\ 2\ 3\ 4\ 5\ 6\ 7\ 8\ 9\ 20.08546],$ and $\gamma = 5.401e^{-5},$ establishing a depth of field goal within the simulation tool that exceeds the depth of field of the initial model; and operating an optimizer of the simulation tool to vary the design parameters until the optimizer converges on final design parameters for the aspheric optics such that the system forms a non-monotonic wavefront phase profile, and such that a final model of the optical imaging system, including the final design parameters, meets or exceeds the depth of field goal.

8. A computer-based method of optimizing an optical surface to extend depth of field of an optical imaging system, comprising providing an initial model of optics of the optical imaging system without the optical surface, in a computer-based simulation tool;

evaluating depth of field of the initial model;

generating a revised model of the optics by adding an initial estimate of design parameters for the optical surface, including a monotonic phase deviation from a spherical surface, to the initial mode, wherein said monotonic phase deviation from a spherical surface includes a surface sag described by:

establishing a depth of field goal within the simulation tool that exceeds a depth of field of the optical imaging system without the optical surface; and operating an optimizer of the simulation tool that varies the design parameters until the optimizer converges on final design parameters for the optical surface that include a non-monotonic phase deviation, with a final model of the optics including the optical surface that meets or exceeds the depth of field goal.

9. The computer-based method of claim 8, wherein providing the initial model includes specifying a position of a back focal plane of the optical imaging system, and operating the optimizer includes allowing the optimizer to vary the position of the back focal plane.

10. A computer-based method of optimizing design of an optical imaging system to extend depth of field of the system, comprising providing an initial model of the optical imaging system in a computer-based simulation tool;

evaluating distribution of electromagnetic energy representing spatial frequency bands throughout an image capture volume of the system, for the initial model;

generating a revised model of the optical imaging system by adding an initial estimate of design parameters for aspheric optics to the initial model, wherein said monotonic phase deviation from a spherical surface includes a surface sag described by:

$$sag(r) = \sum_{i=1}^{6} a_i r^{2i} + \gamma \sum_{j=1}^{10} b_j d^{p_j}$$

where $$d = \begin{bmatrix} r : 0 < r < 0.70418 \\ 0.70418 : \text{otherwise,} \end{bmatrix}$$

$a_{i=1:6} = [\,-4.65e^{-3} \quad -2.90e^{-2} \quad -4.16e^{-1} \quad -1.47 \quad 2.02 \quad -9.62\,]$, $a_{j=1:10} = [-2.18 \quad 2.55$ $\quad\quad\quad\quad 2.59 \quad 3.98 \quad -6.84 \quad 4.07 \quad 7.33 \quad -4.25 \quad 7.68 \quad -36.5\,]$, $p_{j=1:10} = [\,1 \quad 2 \quad 3 \quad 4 \quad 5 \quad 6 \quad 7 \quad 8 \quad 9 \quad 20.08546\,]$, and $\gamma = 5.401e^{-5}$;

establishing a desired distribution of electromagnetic energy representing spatial frequency bands throughout the image capture volume, as a design goal within the simulation tool; and operating an optimizer of the simulation tool to vary the design parameters until the optimizer converges on final design parameters for the aspheric optics such that the system forms a non-monotonic wavefront phase profile, and such that a final model of the optical imaging system, including the final design parameters, meets the distribution of electromagnetic energy throughout the image capture volume design goal.

* * * * *

UNITED STATES PATENT AND TRADEMARK OFFICE
CERTIFICATE OF CORRECTION

| | | |
|---|---|---|
| PATENT NO. | : 8,415,601 B2 | Page 1 of 1 |
| APPLICATION NO. | : 12/867828 | |
| DATED | : April 9, 2013 | |
| INVENTOR(S) | : Bates | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 330 days.

Signed and Sealed this
Twelfth Day of August, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,415,601 B2
APPLICATION NO. : 12/867828
DATED : April 9, 2013
INVENTOR(S) : Rob Bates It is certified that error appears in the above-identified patent and that said Letters Patent is hereby corrected as shown below:

In the Claims

In Claim 7, Column 9, Line 65, "$a_{j=1:10}$ = [ −2.18 2.55" should read --$b_{j=1:10}$ = [ −2.18 2.55--.

In Claim 8, Column 10, Lines 27 through 39,
"phase deviation from a spherical surface includes a surface sag described by:

$$sag(r) = \frac{Cr^2}{1+\sqrt{1-(1+K)C^2r^2}} + \sum_{i=1}^{14} a_i r^i$$

where
$K = conic = 0.800058$,
$C = radius\ of\ curvature = 1.19134$, and
$A_{i=1:14} =$
 [ 0  0  0  -2.83e$^{-2}$  0  -7.36e$^{-2}$  0  -1.41e$^{-1}$  0  -6.33e$^{-1}$  0  -3.05e$^{-1}$  0  3.67 ],".

should read
--phase deviation from a spherical surface includes a surface sag described by:

$$sag(r) = \frac{Cr^2}{1+\sqrt{1-(1+K)C^2r^2}} + \sum_{i=1}^{14} a_i r^i$$

where
$K = conic = 0.800058$,
$C = radius\ of\ curvature = 1.19134$, and

Signed and Sealed this
Seventeenth Day of February, 2015

Michelle K. Lee
*Deputy Director of the United States Patent and Trademark Office*

$A_{i=1:14}$ = [ 0  0  0  -2.83e$^{-2}$  0  -7.36e$^{-2}$  0  -1.41e$^{-1}$  0  -6.33e$^{-1}$  0  -3.05e$^{-1}$  0  3.67 ],--.

In Claim 10, Column 11, Lines 10 through 12, "$a_{j=1:10}$ = [-2.18  2.55 2.59  3.98  -6.84  4.07  7.33  -4.25  7.68  -36.5 ],"

should read --$b_{j=1:10}$ = [-2.18  2.55 2.59  3.98  -6.84  4.07  7.33  -4.25  7.68  -36.54],--.